United States Patent [19]
Corrigan et al.

[11] Patent Number: 5,897,662
[45] Date of Patent: Apr. 27, 1999

[54] PSEUDO-RANDOM ADDRESS GENERATION MECHANISM THAT REDUCES ADDRESS TRANSLATION TIME

[75] Inventors: Michael Joseph Corrigan; Sheldon Bernard Levenstein; Terrence James Stewart, all of Rochester, Minn.

[73] Assignee: International Business Machines Corporation, Armonk, N.Y.

[21] Appl. No.: 08/517,759

[22] Filed: Aug. 18, 1995

[51] Int. Cl.[6] ................................................. G06F 12/02
[52] U.S. Cl. .......................... 711/173; 711/170; 395/670
[58] Field of Search .............................. 395/183.12, 404, 395/421.06, 403, 405, 455, 601, 463, 417, 419, 497.01, 412, 440, 427, 497.04; 379/232

[56] References Cited

U.S. PATENT DOCUMENTS

| | | | |
|---|---|---|---|
| 3,626,378 | 12/1971 | Salle et al. ............................. | 379/232 |
| 4,064,558 | 12/1977 | Hughes et al. .......................... | 395/417 |
| 4,463,424 | 7/1984 | Mattson et al. ......................... | 395/463 |
| 4,484,262 | 11/1984 | Sullivan et al. ................... | 395/421.06 |
| 4,550,368 | 10/1985 | Bechtolsheim .......................... | 395/416 |
| 4,736,287 | 4/1988 | Druke et al. ............................ | 395/455 |
| 4,736,293 | 4/1988 | Patrick .................................... | 395/455 |
| 4,835,734 | 5/1989 | Kodaira et al. ......................... | 395/419 |
| 4,922,417 | 5/1990 | Churm et al. ........................... | 395/601 |
| 5,133,061 | 7/1992 | Melton et al. .......................... | 395/455 |
| 5,155,844 | 10/1992 | Cheng et al. ...................... | 395/183.12 |
| 5,247,674 | 9/1993 | Kogure ................................ | 395/497.01 |
| 5,276,826 | 1/1994 | Rau et al. ............................... | 395/405 |
| 5,301,288 | 4/1994 | Newman et al. ........................ | 395/412 |
| 5,386,536 | 1/1995 | Courts et al. ............................ | 395/463 |
| 5,392,410 | 2/1995 | Liu .......................................... | 395/403 |
| 5,530,829 | 6/1996 | Beardsley et al. ...................... | 395/440 |
| 5,559,980 | 9/1996 | Connors et al. ........................ | 395/427 |
| 5,561,785 | 10/1996 | Blandy et al. ...................... | 395/497.01 |
| 5,561,786 | 10/1996 | Morse ................................ | 395/497.01 |
| 5,588,138 | 12/1996 | Bai et al. ............................ | 395/497.04 |
| 5,596,736 | 1/1997 | Kerns ...................................... | 395/404 |
| 5,659,715 | 8/1997 | Wu et al. ........................... | 395/497.01 |

OTHER PUBLICATIONS

Jerry Huck et al., "Architectural Support for Translation Table Management in Large Address Space Machines," 1993 IEEE, pp. 39–50.

*Primary Examiner*—Tod R. Swann
*Assistant Examiner*—Fred F. Tzeng
*Attorney, Agent, or Firm*—Steven W. Roth

[57] ABSTRACT

It is known that virtual memory segments that are allocated together tend to be used together. With existing sequential address allocation mechanisms, this in turn means that programs tend to end up using the same set or sets of virtual segment addresses (i.e., in the same minitable or minitables), which, as mentioned, leads to increased address translation time because of clumping. The address allocation mechanism of the present invention reduces clumping by allocating virtual segment addresses in a pseudo-random order. This decreases the likelihood that virtual segment addresses that are allocated together end up in the same set or sets of virtual segment addresses within the address translation table.

1 Claim, 11 Drawing Sheets

Sets 0-3

```
---------- UNUSED ----------
---------- ENTRIES ----------
```

Set 4

| Segment 4, Page 0 | Real Address |
| Segment 5, Page 1 | Real Address |
| Segment 6, Page 2 | Real Address |
| Segment 7, Page 3 | Real Address |

Set 5

| Segment 4, Page 1 | Real Address |
| Segment 5, Page 0 | Real Address |

Set 6

| Segment 4, Page 2 | Real Address |
| Segment 6, Page 0 | Real Address |

Set 7

| Segment 6, Page 1 | Real Address |
| Segment 5, Page 2 | Real Address |

Sets 8-15

```
---------- UNUSED ----------
---------- ENTRIES ----------
```

FIG. 4A

| Set | |
|---|---|
| Set 0 | Segment 2, Page 2 \| Real Address |
| Set 1 | ----------UNUSED---------- |
| Set 2 | Segment 2, Page 0 \| Real Address |
| Set 3 | Segment 2, Page 1 \| Real Address |
| Set 4 | ----------UNUSED---------- |
| Set 5 | Segment 7, Page 2 \| Real Address |
| Set 6 | Segment 7, Page 1 \| Real Address |
| Set 7 | Segment 7, Page 0 \| Real Address |
| Sets 8-10 | ----------UNUSED---------- |
| Set 11 | Segment 8, Page 3 \| Real Address |
| Set 12 | Segment 13, Page 1 \| Real Address |
| Sets 13-14 | ----------UNUSED---------- |
| Set 15 | Segment 13, Page 2 \| Real Address |

FIG. 6A

PSEUDO-RANDOM ADDRESS GENERATION MECHANISM THAT REDUCES ADDRESS TRANSLATION TIME

FIELD OF THE INVENTION

The present invention relates to data processing systems. More particularly, the present invention relates to address translation within a computer system.

BACKGROUND OF THE INVENTION

The development of the EDVAC computer system of 1948 is often cited as the beginning of the computer era. Since that time, computer systems have evolved into extremely sophisticated devices. However, even today's most sophisticated computer systems continue to include many of the basic elements that were present in some of the first computer systems. Two such elements are the computer system's processor and memory. A computer system's processor is the intelligent portion of the computer system. The processor is responsible for executing programs that interpret and manipulate information that is given to the computer system by the computer system's user or users.

As is well known, this information (called data) is stored in the computer system's memory. Computer system memory is generally categorized into two types. While there are various names used to characterize these two basic types of computer system memory, the terms used in this patent document are "main memory" and "auxiliary storage." Computer system information is located using what are called "memory addresses." Information stored in main memory is located via addresses known as real addresses, while information stored in auxiliary storage is located in a way that is specific to the particular type of auxiliary storage device. In general, main memory is used by the computer system to store information that is of current interest to the programs executing on the computer system's processor. Auxiliary storage, on the other hand, is used to store information that is not currently needed by the programs.

Over the years, computer system designers have created numerous types of addressing schemes. While these addressing schemes are quite complicated and vary to a large degree, most modern day addressing schemes share the concept of "virtual addressing." At the most fundamental level, virtual addressing allows most programs to operate without having to understand whether needed information is stored in main memory or in auxiliary storage. In other words, virtual addressing allows programs to locate and access needed information through a single virtual address regardless of whether the information is actually stored in main memory or in auxiliary storage. When taken together, the virtual addresses of a computer system are said to form the computer system's virtual address space, or just address space for short.

In operation, a program that needs to gain access to a particular piece of information presents the virtual address to the computer system. The computer system first checks to see if the information is available in main memory. The computer system does this by attempting to translate the presented virtual address into a real address. If the translation is successful, the computer system simply allows the program to go ahead and access the information using the real address. However, if the translation fails, the computer system's processor knows that it cannot access the information directly. Therefore, the computer system will move the needed information from auxiliary storage into main memory (if necessary), translate the virtual address into a real address, and then allow the program to access the information using the real address. It should be pointed out here that the time it takes for a computer system to translate a virtual address into a real address is a key factor in overall system performance. It is desirable to take as little time as possible to make the translation because the longer it takes, the longer the requesting program has to wait for its information. Therefore, computer system designers are continually working on ways to speed up address translation.

As time passes, minimizing address translation time is becoming increasingly difficult because computer systems are designed with more and more virtual addresses so that they can handle more and more information. The difficulty arises because the larger the address space, the more difficult it is to manage, control, and coordinate how all those individual addresses are used by programs. One way to at least help organize the problem of managing a large address space is to break up the addresses into logical ranges of addresses. These ranges are sometimes called "virtual memory partitions" or "virtual memory segments." The virtual partitions or segments are then typically further broken into smaller ranges called "virtual memory pages." For readability, the word "virtual" is dropped during much of the ensuing discussion. Unless otherwise qualified, words and phrases such as address, memory page and segment should be taken to refer to virtual addresses, memory pages, and/or segments. When a program wants to store information, it requests allocation of a segment.

The management of these segments and pages is commonly facilitated through the use of address translation tables (sometimes called "page tables"). Address translation tables typically include entries that are used to convert virtual addresses into real addresses (i.e., each entry includes a virtual address and the associated real address). If a presented virtual address can be found in the translation table, it can be translated into a real address.

However, the way in which today's address tables are designed and managed has become a serious impediment to the continued reduction of address translation time. The translation time problem is caused by the combination of two factors. The first factor is the fundamental way in which address translation tables are usually designed. Address translation tables are typically designed such that specific portions of the table are reserved for specific sets of virtual addresses, which means that each reserved portion becomes a table unto itself (a minitable if you will). The second factor is the basic way in which programs tend to behave relative to virtual memory segments. It has been observed that segments that are allocated in close time proximity tend to be used in close time proximity. These two factors combine to cause clumping in the address translation table because the table entries end up being either logically or physically very close to one another. In other words, some of the minitables become full or over utilized, while others are unused or under utilized. The clumping in turn causes a slow down in average address translation time because the computer system must always sift through all the table entries in a full or nearly full minitable every time it needs to translate a presented virtual address into a real address.

Without a mechanism that reduces address translation time and thereby reduces the associated performance cost to executing programs, computer systems will never fully realize the benefits of virtual addressing.

SUMMARY OF THE INVENTION

It is, therefore, a principal object of this invention to provide a computer system with an enhanced mechanism for handling address translation.

It is another object of this invention to provide an enhanced address allocation mechanism that provides a better distribution of virtual addresses within an address translation table.

It is still another object of this invention to provide an enhanced address allocation mechanism that provides a better distribution of virtual addresses within an address translation table by using a pseudo-random number generator to randomize virtual addresses during virtual address allocation.

These and other objects of the present invention are accomplished by the enhanced address allocation mechanism disclosed herein.

As described in the background section, the translation time problem is caused by 1) the way in which address translation tables are designed and managed and 2) the way in which executing programs tend to access information.

Segments that are allocated together tend to be used together. With existing sequential address allocation mechanisms, this in turn means that programs tend to end up using the same set or sets of virtual segment addresses (i.e., in the same minitable or minitables), which, as mentioned, leads to increased address translation time because of clumping. The address allocation mechanism of the present invention reduces clumping by allocating virtual segment addresses in a pseudo-random order. This decreases the likelihood that virtual segment addresses that are allocated together end up in the same set or sets of virtual segment addresses within the address translation table. In other words, this pseudo-random allocation of segment virtual addresses creates an even distribution of table entries in the address translation table, which reduces translation time because the computer system does not need to sift through a full or nearly full minitable every time it needs to translate a virtual address into a real address.

BRIEF DESCRIPTION OF THE DRAWINGS

FIGS. 4A and 4B show how example virtual addresses are distributed in an address translation table after being allocated by a sequential prior art address allocation mechanism.

FIGS. 6A and 6B show how example virtual addresses are distributed in an address translation table after being allocated by the address allocation mechanism depicted in FIG. 5.

DETAILED DESCRIPTION

Figure 1:
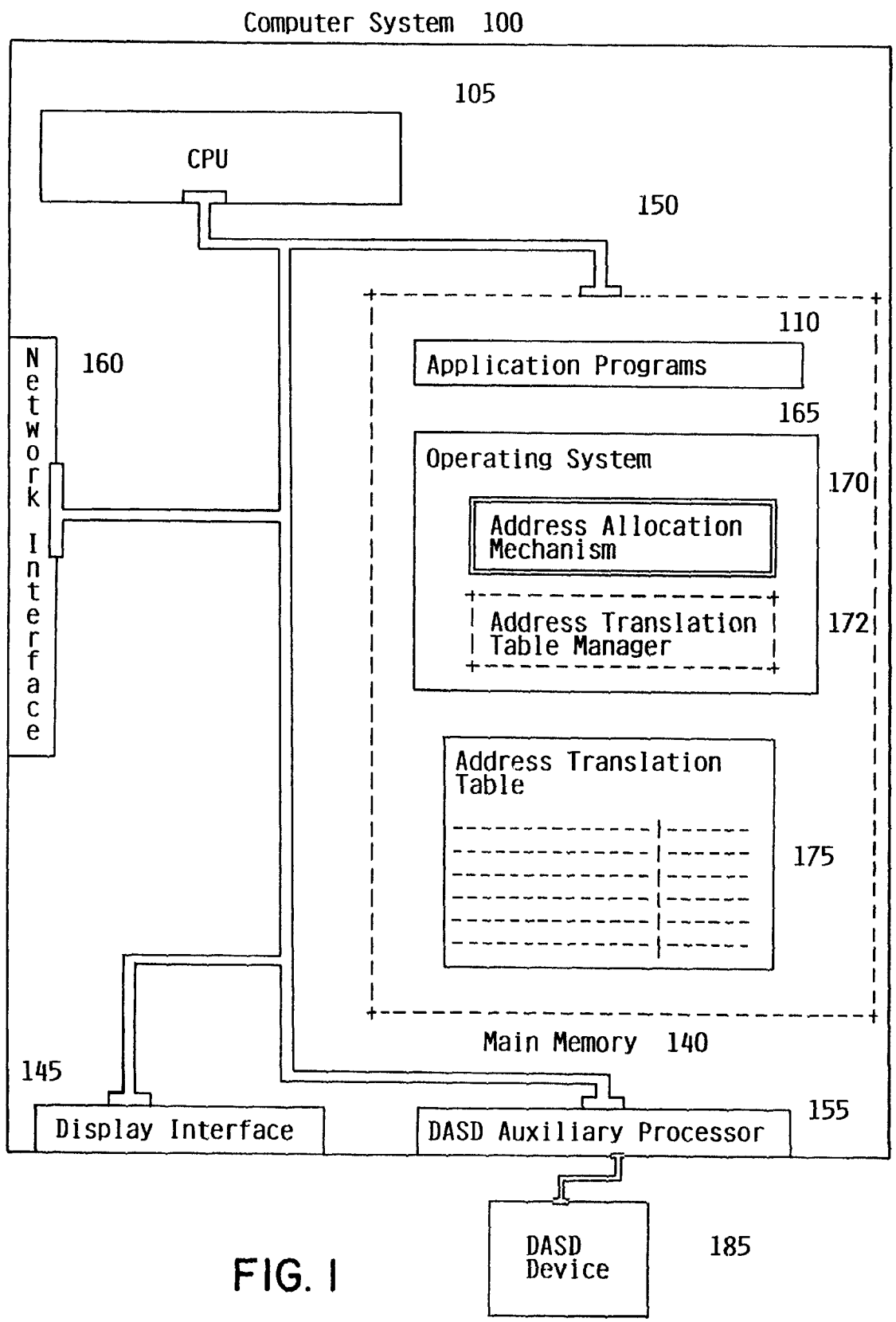
FIG. 1 is a block diagram of the computer system of the present invention.

FIG. 1 shows a block diagram of the computer system of the present invention. The computer system of the preferred embodiment is an enhanced IBM AS/400 mid-range computer system. However, those skilled in the art will appreciate that the mechanisms and apparatus of the present invention apply equally to most any computer system, regardless of whether the computer system is a complicated multi-user computing apparatus or an imbedded computer system found in a personal electronic device.

As shown in the exploded view of FIG. 1, computer system 100 comprises main or central processing unit (CPU) 105, main memory 140, display interface 145, network interface 160, and DASD auxiliary processor 155. All of these devices are connected together via system bus 150.

Display interface 145 allows system administrators and computer programmers to communicate with computer system 100, normally through programmable workstations. Network interface 160 is used by computer system 100 to communicate with other computer systems. DASD auxiliary processor 155, which is shown to be connected to DASD device 185, provides the interface between computer system 100 and DASD device 185.

Main memory 140 contains application programs 110, operating system 165, and address translation table 175. Operating system 165 is further shown to contain address allocation mechanism 170 and address translation table manager 172. Those skilled in the art will appreciate that operating system 165 and/or address allocation mechanism 170 is/are capable of being distributed as a program product via a floppy disk, CD ROM, or other form of recordable media, or via any type of electronic transmission mechanism.

Figure 2:
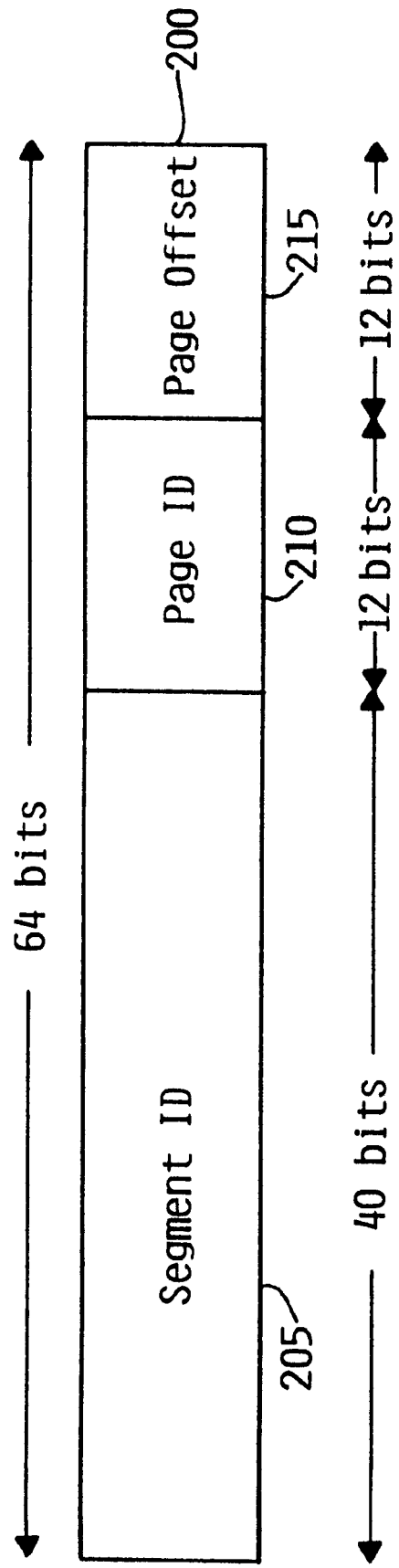
FIG. 2 is a block diagram of the format of the virtual address of the preferred embodiment.

FIG. 2 is a block diagram showing the format of the virtual address of the preferred embodiment. As shown, virtual address format 200 is comprised of segment identifier 205, page identifier 210, and page offset 215. Segment Id. 205, which is 40 bits long in the preferred embodiment, is used by operating system 165 to specify a specific segment within the virtual address space of computer system 100. Page Id 210, which is 12 bits long in the preferred embodiment, is used by programs to specify a specific page within a given segment. Page offset 215, which is shown to be 12 bits long in the preferred embodiment, is used by programs to specify a specific memory offset within a given page.

Those skilled in the art will appreciate that example virtual address format 200 represents just one way in which a virtual address space can be divided and that the present invention is applicable to any addressing scheme that involves dividing a virtual address space into logical storage aggregates, regardless of the size of those storage aggregates or the words used to describe those logical storage aggregates.

When a program wants to store information on computer system 100, it requests space in virtual memory. The request includes the amount of space (in terms of memory pages) that is needed. Address allocation mechanism 170 of operating system 165 receives the request and allocates a memory segment to the requesting program. The segment is represented by segment Id. 205. The program then uses segment Id. 205 as a base for one or more virtual addresses that are used to reference information within the segment identified by segment Id. 205.

Figure 3A:
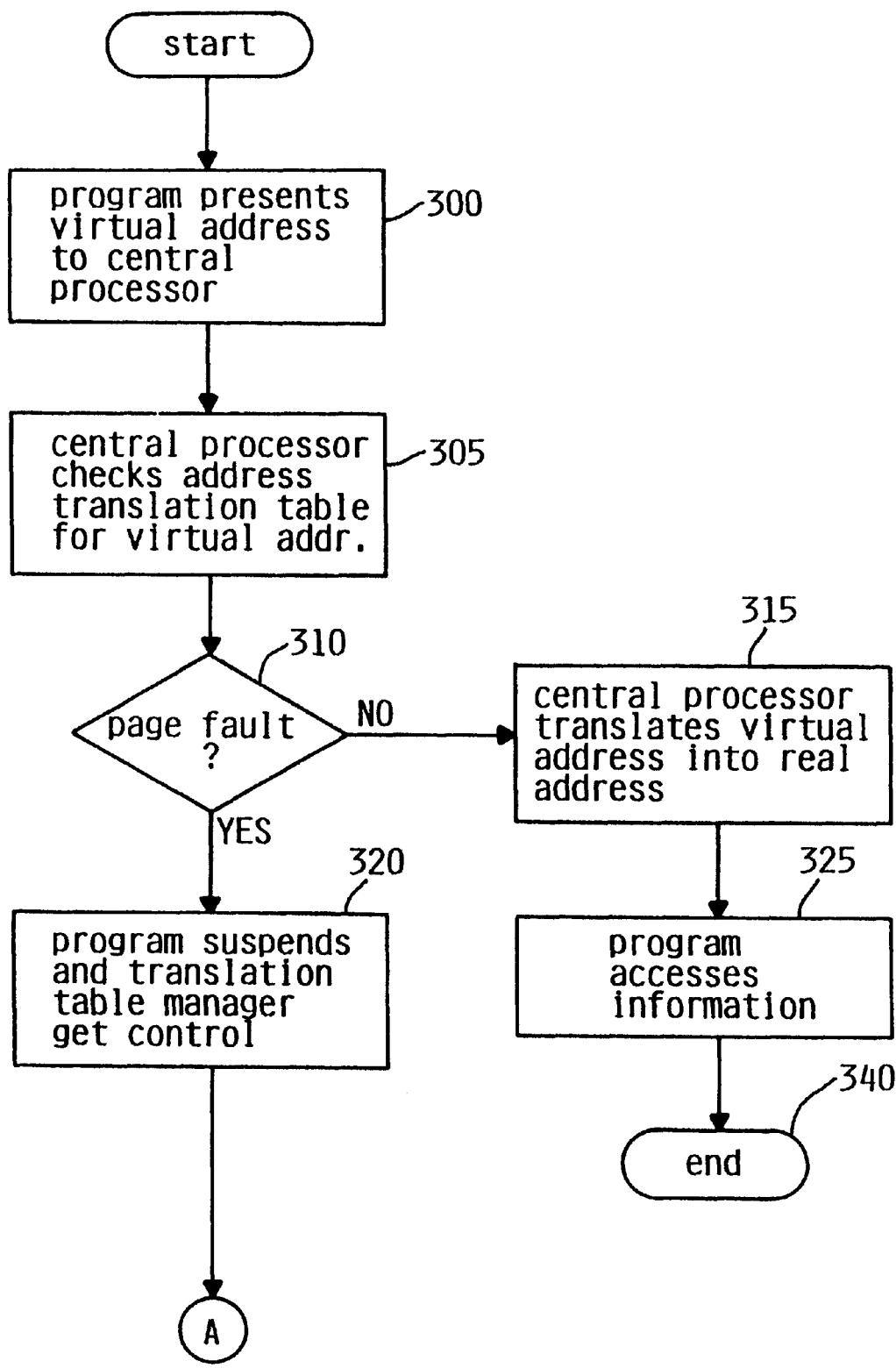
FIG. 3 is a flow diagram of the logical steps used to manage an address translation table that is used in conjunction with FIGS. 4A and 4B to illustrate how a poorly utilized address translation table can increase address translation time and with FIGS. 6A and 6B to illustrate how a well utilized address translation table can reduce address translation time.
Figure 3B:
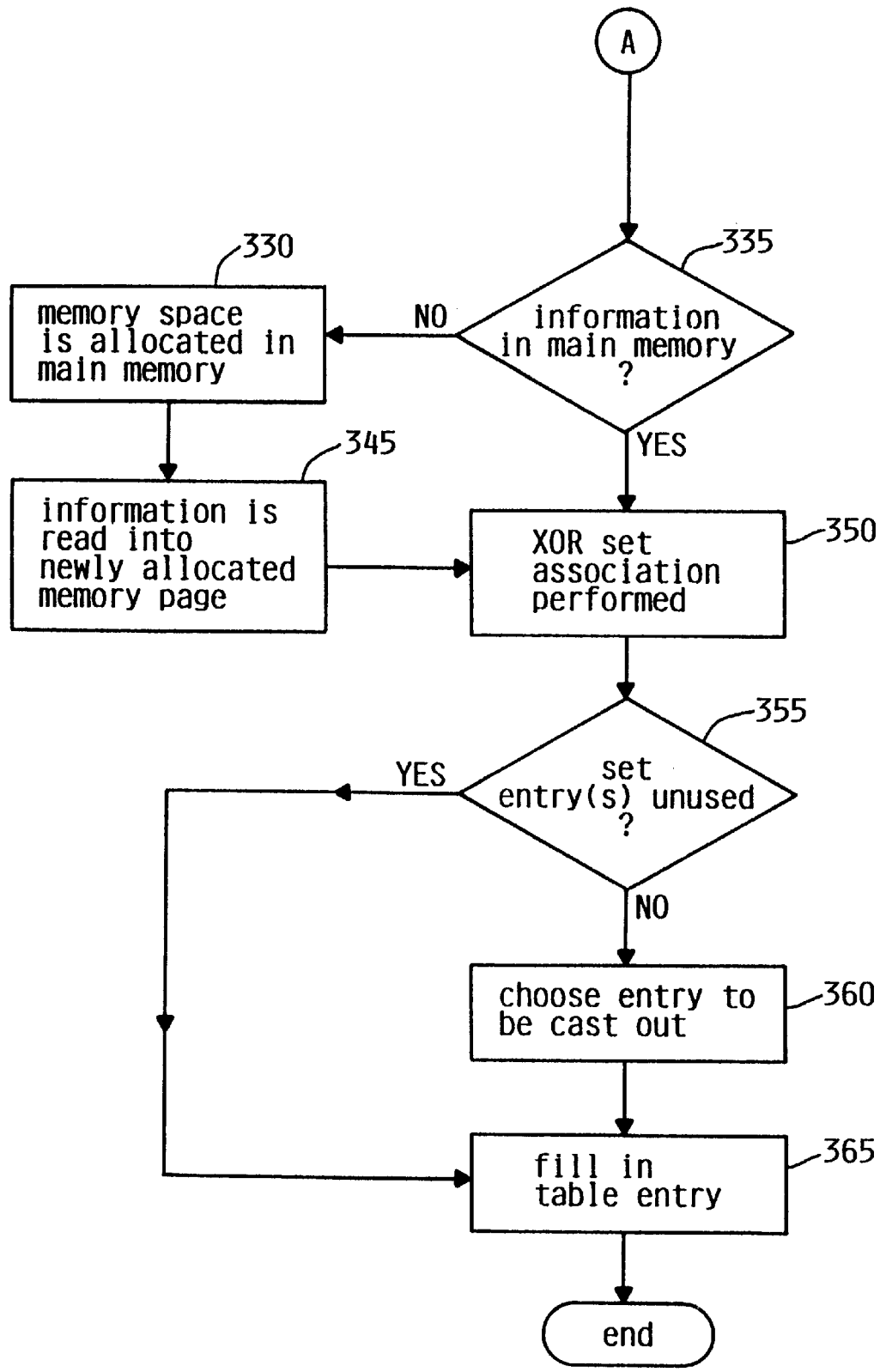

FIG. 3 is a flow diagram of the logical steps used to manage an address translation table. Some of the steps shown are performed directly by central processing unit 105, while others are performed by address translation table manager 172.

For the purposes of explanation, an overview of FIG. 3 is presented here prior to the presentation of specific examples. When a program wishes to access information, it will present a virtual address to central processing unit 105. This step is shown as block 300 on FIG. 3. As described in the Background section, central processing unit 105 would then use address translation table 175 to attempt to convert the presented virtual address into a real address [block 305]. If central processing unit 105 is able to locate the presented virtual address in address translation table 175, no page fault will occur [block 310], which means that central processing unit 105 will proceed to translate the presented virtual address into a real address [block 315] and then use that real address to access the information for the requesting program [block 325]. If central processing unit 105 is not able to locate the presented virtual address in address translation table 175, a page fault will occur [block 3 10], which means that the requesting program will suspend and address translation table manager 172 will take control of central processing unit 105 [block 320]. (The terms address translation table manager, translation table manger, and table manager should be considered to have equivalent meaning.)

Address translation table manager 172 first checks whether the presented virtual address represents information that is actually stored in main memory 140. Those skilled in the art understand that there are any number of ways this could be accomplished. Accordingly, details of how the contents of main memory 140 are checked against a virtual address are not presented herein. If the requested information is not in main memory 140, table manager 172 will allocate space in main memory 140 (i.e., an appropriate number of memory pages) [block 330] and then move the information into main memory 140 from an auxiliary storage device (e.g., DASD device 185) [block 345]. Again, those skilled in the art will appreciate that there are any number of ways that this could be accomplished and that the present invention is not limited to any one approach.

Regardless of whether the information is present in main memory 140 (i.e., as determined in block 335), table manager 172 will eventually perform an exclusive OR (XOR) set association in block 350. The XOR set association of block 350 is commonly referred to as a hash function. The hash function is what "associates" specific sets of virtual addresses with specific portions of the table. Stated another way, set association is what creates the logical minitables (called "sets" herein) within the table. In the preferred embodiment, the set association is accomplished by performing an exclusive OR (XOR) on a portion of segment Id. 205 and a portion of page Id. 210. However, those skilled in the art will appreciate that there are any number of ways in which set association could be performed and that the present invention is not limited to any particular hashing function or to hashing functions in general. Set association will be explained in more detail in the paragraphs that follow.

Once a specific set has been selected in block 350, address translation table manager 172 will next determine whether there are any unused entries in the selected set [block 355]. If there are no unused entries in the set, table manager 172 chooses an entry to cast out. In the preferred embodiment, the least recently used entry is cast out, but those skilled in the art will appreciate that there are any number of ways to choose the entry that is to be over written. Regardless of whether there are any unused entries in the selected set, the chosen or unused entry is filled in [block 365]. "Filled in" means that the presented virtual address and the real address for the space in main memory 140 (i.e., from block 330 if the information had to be moved into main memory 140) are placed in the entry.

Table manager 172 then returns control of central processor 105 to the requesting program through a standard return from interrupt mechanism. This causes the program to once again present the virtual address to central processor 105. Since an entry for the virtual address is now present in address translation table 175, address translation proceeds without a page fault (see blocks 300, 305, 310, 315, and 325).

A Poorly Utilized Address Translation Table

Consider now the address translation table of FIG. 4A. FIG. 4A shows how example virtual addresses would be distributed in address translation table 172 after being allocated sequentially, as is done in prior al t address allocation mechanisms. The image of address translation table 172 is referred to as address translation table 400 within this section of the specification. For the purposes of explanation, address translation table 400 is shown to comprise only 16 sets of table entries. However, those skilled in the art will appreciate that in practice address translation tables may have many more sets of entries.

The reader should notice that address translation table 400 includes some sets that have several filled entries and some sets that are wholly unused. As indicated in the Background section, this poor utilization is partially attributable to the manner in which programs tend to behave relative to allocation of virtual memory segments. Essentially, the behavioral aspect of the problem is caused by the fact that programs tend to use only the first few pages of an assigned segment, even though each segment is made up of many individual pages. The virtual addresses of sets 4 through 7 represent this typical program behavior. As shown, the only pages represented in the entries are pages 0–3 of the various segments, even though there are thousands of other pages that make up the segments involved.

When combined with the set associative design of today's address translation tables, this typical program behavior causes clumping to occur within the table. This clumping in turn causes increased translation time. For example, consider a program that presented a virtual address of segment 15, page 11 to central processing unit 105. Referring back to FIG. 3, this would logically occur in block 300. In block 305, central processing unit 105 will check address translation table 400 to ascertain whether the presented virtual address (i.e., segment 15, page 11) was present. Central processing unit 105 would do this by first performing a set association on the presented address to select a specific set within address translation table 400. Then, central processing unit 105 would look at all of the entries in the selected set to determine if one of the entries matched the presented virtual address. Though not previously explained, it should be pointed out that the set association performed by central processing unit 105 and that performed by address translation table manger 172 in block 350 must be logically equivalent. This is to ensure that the sets created by table manager 172 are the same as those understood by central processing unit 105. The need for this relationship is clear to those skilled in the art. It should also be noted that page offset 215 is not used in the preferred embodiment to perform set association. Therefore, the virtual addresses reference a specific virtual memory page. Since page offsets are not important to the present discussion, further details are not included herein.

For the purposes of explanation, the set association used is to exclusive OR the low order 4 bits of the segment Id with the low order 4 bits of the page Id. As mentioned, this is commonly known in the art as a hashing function. When considering the size of the address translation table at issue, the function is: (segment Id XOR page Id) MOD (number of sets in table). The MOD operation is the standard remainder operator that is available on most computer systems. Again, use of the remainder operator in this context is understood by those skilled in the art. It should also be pointed out here that it is desirable to use a straight forward method of set association because set association must be performed every time an address is translated, which means that the operation must be as fast as possible.

Continuing the example, presentation of a virtual address of segment 15, page 11 to central processing unit 105 will cause central processing unit 105 to look in set 4 for the subject address [i.e., (1111 XOR 1011) MOD 16=4]. Since the presented address is not one of the four entries within set 4, central processing unit 105 will signal a page fault [block 310 of FIG. 3], cause the requesting program to suspend and give control to table manager 172 [block 320]. Table manager 172 must first determine whether the information is in main memory [block 335]. Assume for the purposes of explanation, that the information is in main memory 140. This being the case, table manager 172 will proceed to perform the above-described set association operation. As before, the result of this operation will be the selection of set 4 of address translation table 400. Once set 4 has been selected, table manager 172 must next determine whether there are any unused entries in set 4 [block 355]. Finding that there are no unused entries, table manager 172 must select an entry to be cast out [block 360] and proceed to fill in the selected entry with the presented virtual address and the real address in main memory 140. For the purposes of illustration, assume here that table manager 172 chooses to cast out the address translation table entry associated with the virtual address of segment 4, page 0. At this point, it is important to point out that the entry for virtual address segment 4, page 0 was cast out even though there were entries in other sets of address translation table 400 that were unused.

This accomplished, table manager 172 then returns control of central processor 105 to the requesting program via a return from interrupt mechanism. As discussed, this causes the program to once again present the virtual address to central processor 105. Since an entry for the virtual address is now present in address translation table 175, the address translation proceeds without a page fault (see blocks 300, 305, 310, 315, and 325).

Figure 4B:
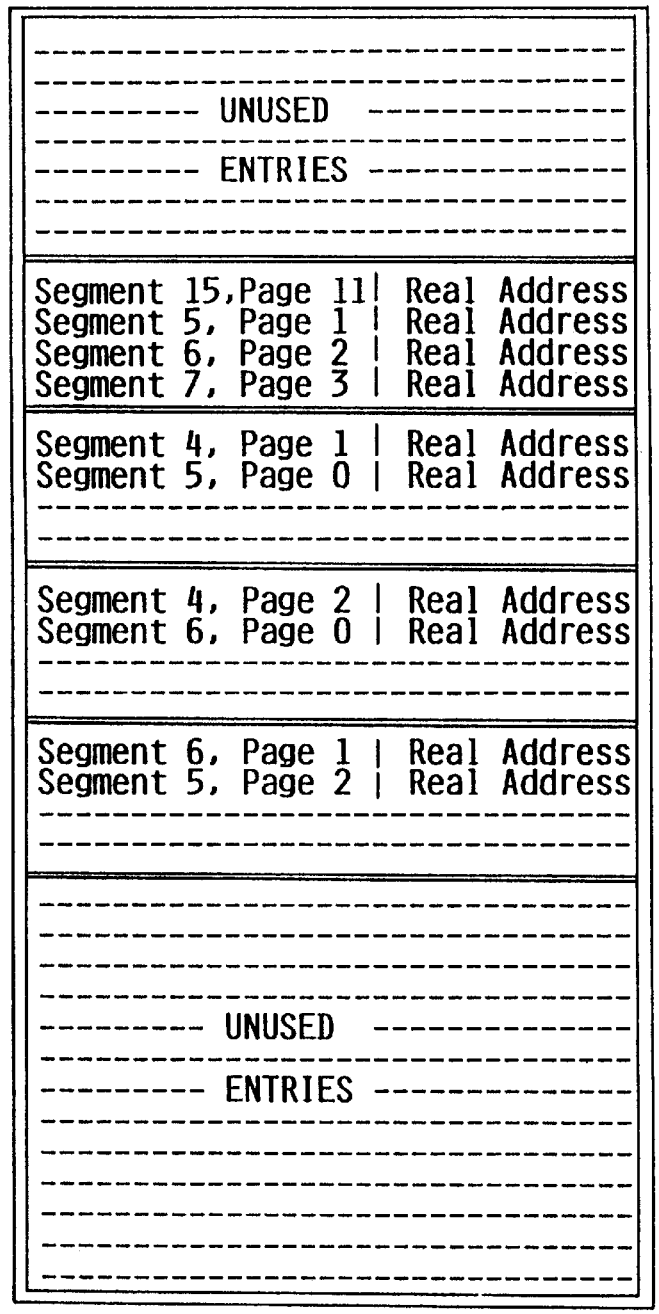

FIG. 4B shows how address translation table 400 would appear after the virtual address of segment 4, page 0 had been cast out. Assume here for the purposes of explanation that an executing program wants to once again access information that is stored at the virtual address represented by segment 4, page 0. This will again cause presentation of the virtual address in block 300, selection of set 4 by central processing unit 105 in block 305, a page fault in block 310 and the subsequent processing by table manager 172 of blocks 335 350, 355, 360, and 365. At this point, it is important to emphasize that all of this table manager processing was necessary because there was not an entry in address translation table 400 that corresponded to the presented virtual address. Had an entry existed, the translation time would have merely amounted to execution of logical blocks 315 and 325. Again, the reader should note that both of these blocks represent logical operations that are handled directly by central processing unit 105 without the intervention of table manager 172. Accordingly, had an entry existed, the address translation time would have been orders of magnitude less. The reader should also note that the slower translation time was caused by the clumping in the table, since there are entire sets of entries that are wholly empty.

Pseudo-Random Segment Allocation

Figure 5:
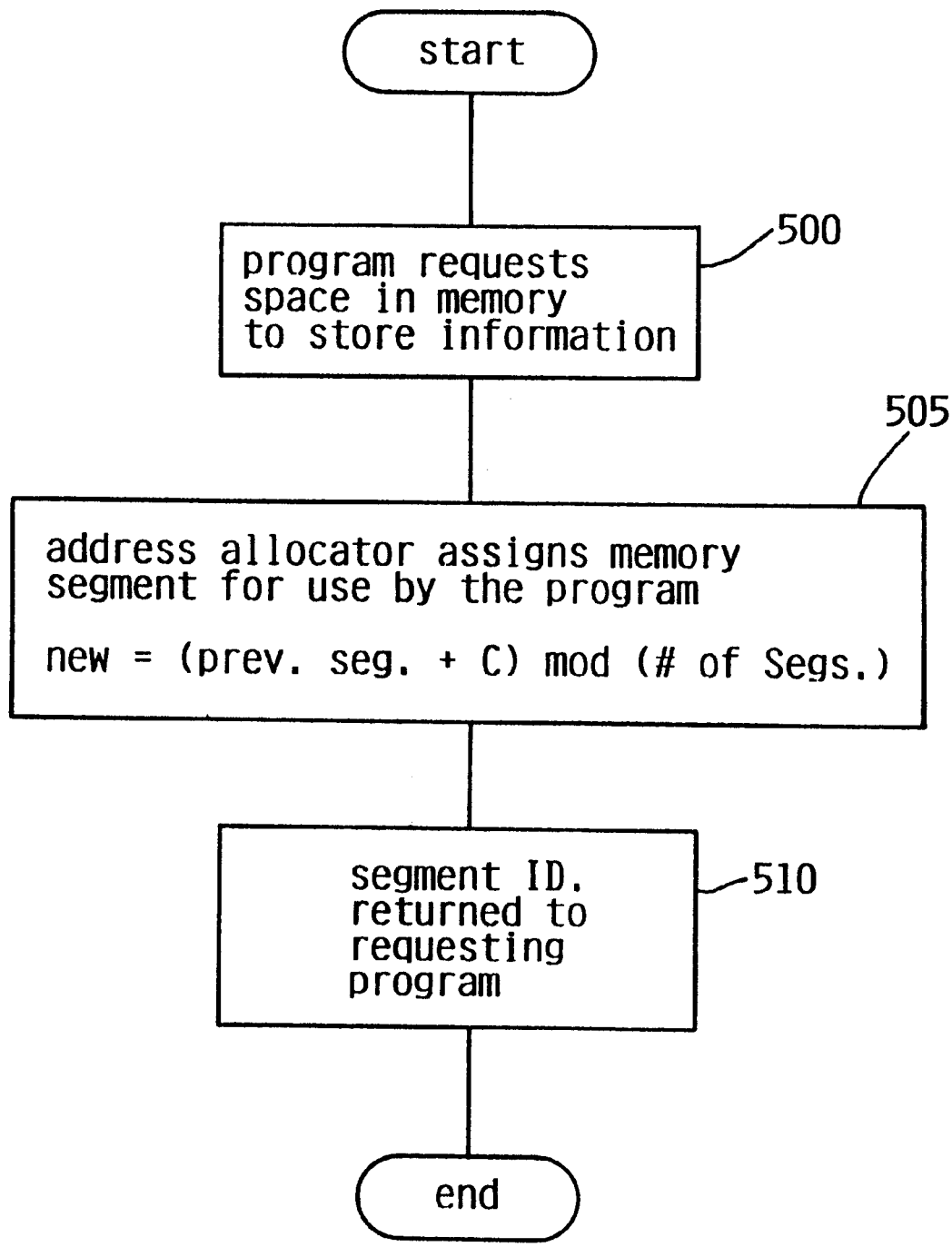
FIG. 5 is a flow diagram of an address allocation mechanism that has been constructed to carry out steps of the present invention in accordance with the preferred embodiment.

FIG. 5 is a flow diagram of an address allocation mechanism that has been constructed to carry out steps of the present invention according to the preferred embodiment. As discussed in the Summary section, the present invention reduces address translation time by randomizing segment Ids during address allocation. The randomization of segment Ids is an improvement over prior art mechanisms that allocate segments sequentially.

Block 500 represents a program that requests a virtual memory segment for the purpose of storing information. When address allocation mechanism 170 of the present invention receives such a request, it proceeds to allocate the next segment in a pseudo-random manner [block 505]. More specifically, the new segment is allocated via the following formula: new segment Id.=(previous segment Id.+C) MOD (number of allocable segments within the system's virtual memory). Experimentation has shown that constant C can be any odd number and that odd numbers somewhat greater than half the number of allocable segments within the system's virtual memory work well. In addition, the number of allocatable segments with the systems virtual memory should be a power of 2. Since the examples used in this specification assume that computer system 100 includes 16 allocable segments within its virtual memory, the number 11 works well. It should be emphasized here that those skilled in the art will recognize that there are key benefits and advantages that come directly from pseudo-random allocation, independent of the specific means used to achieve the pseudo-random allocation. Therefore, those skilled in the art will also recognize that the present invention is not limited to any one pseudo-random number generating formula.

Once address allocation mechanism has allocated a segment for use by the requesting program, it returns the associated segment Id. to the requesting program [block 510].

A Well Utilized Address Translation Table

FIG. 6A shows how example virtual addresses are distributed in address translation table 175 after being allocated by the address allocation mechanism depicted in FIG. 5. The image of address translation table 175 is referred to as address translation table 600 within this section of the specification. As discussed in the Background section, segments that are allocated together tend to be used together. With prior art sequential address allocation mechanisms, this means that those segments end up near each other in virtual memory. This fact, coupled with the fact that set association operations reserve sets of address translation table entries for specific sets of pages, causes clumping of virtual addresses (ie page addresses) within the address translation table. The solution is to allocate segment Ids in a pseudo-random order. This in turn results in "randomized" virtual segment addresses, which reduces the clumping that increases address translation time.

For the purposes of explanation, address translation table 600 was drawn assuming that the virtual address space of computer system 100 was made up of only 16 segments. Those skilled in the art understand that in practice virtual address spaces may well be made up of many segments. An address space of 16 segments and a constant C equal to 11, will yield generation of the following segment Ids.

| Order of Segment Allocation | Segment Id |
|---|---|
| 0 | 11 |
| 1 | 6 |
| 2 | 1 |
| 3 | 12 |
| 4 | 7 |
| 5 | 2 |
| 6 | 13 |
| 7 | 8 |
| 8 | 3 |
| 9 | 14 |
| 10 | 9 |
| 11 | 4 |
| 12 | 15 |
| 13 | 10 |
| 14 | 5 |
| 15 | 0 |

As shown in FIG. 6A, address allocation mechanism 170 of the present invention provides for an even distribution of addresses throughout address translation table 600. As before, addresses are placed in the address translation table by performing a set association on the segment Id and the page Id (see blocks 350 through 365 of FIG. 3). For example, consider the following: page 0 of the fifth segment allocated, segment 7, is placed in set 7; page 1 of the sixth segment allocated, segment 2, is placed in set 3 page 2 of the seventh segment allocated, segment 13, is placed in set 15; and page 3 of the eighth segment allocated, segment 8, is placed in set 11. By contrast, consider again the placement of the fifth, sixth, seventh and eighth segments allocated using the sequential address allocation of the prior art: page 0 of the fifth segment allocated, segment 4; page 1 of the sixth segment allocated, segment 5; page 2 of the seventh segment allocated, segment 6; and page 3 of the eighth segment allocated, segment 7, arc all placed in set 4 by table manager 172 (see FIG. 4A). In other words, address allocation mechanism 170 of the present invention creates an even distribution of virtual addresses within the address translation table, which is not seen using prior art sequential address allocation.

Figure 6B:
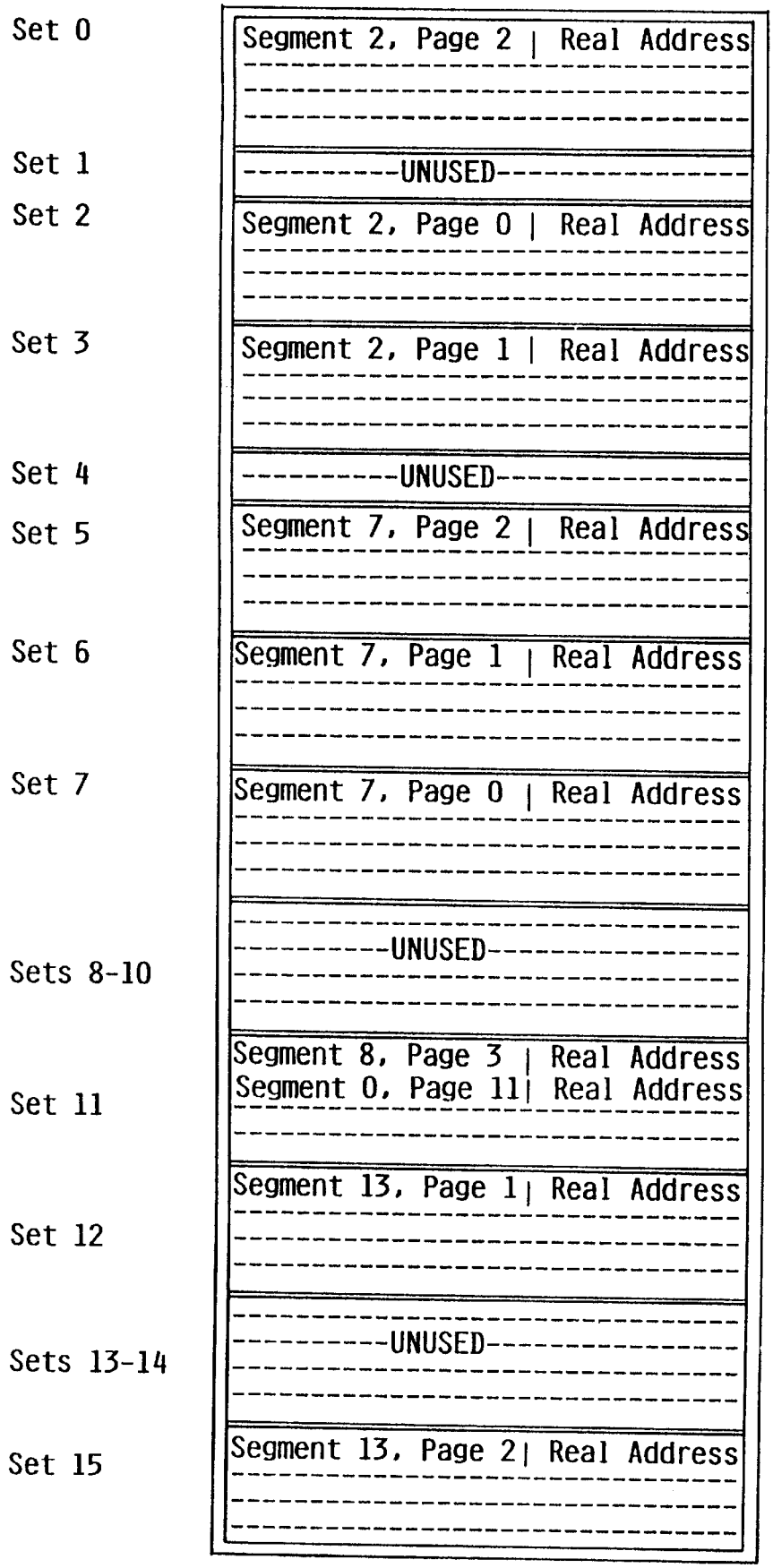

The benefits of this even distribution are illustrated by contrasting FIGS. 4B and 6B. When prior art sequential address allocation was used, presentation of segment 15, page 11 (i.e., the sixteenth segment allocated) caused the entry for page 0 of segment 4 (i.e., the fifth segment allocated) to be cast out. Then, when a program wanted to once again access page 0 of segment 4, table manager 172 was forced to cast out yet another entry of set 4 to make room for an entry for page 0 of segment 4. As described in the text associated with FIG. 4B, this amounts to presentation of the virtual address in block 300 of FIG. 3, selection of set 4 by central processing unit 105 in block 305, a page fault in block 310 and the subsequent processing by table manager 172 of blocks 335, 350. 355, 360, and 365.

FIG. 6B shows that use of address allocation mechanism 170 of the present invention would do away with the need for this additional table manger processing. When page 11 of the sixteenth segment allocated (i.e. segment 0) was presented to central processing unit 105 and ultimately to table manager 172, it would be placed in a previously unused entry of set 11. This means that when a program presented page 0 of the fifth segment allocated (i.e. , segment 7) to central processing unit 105, central processing unit 105 could make the address translation through reference to set 7 and thereby give the requesting program access to the information (see blocks 305, 315, and 325 of FIG. 3) without having to rely on the intervention of table manger 172.

ALTERNATE EMBODIMENTS

Figure 7A:
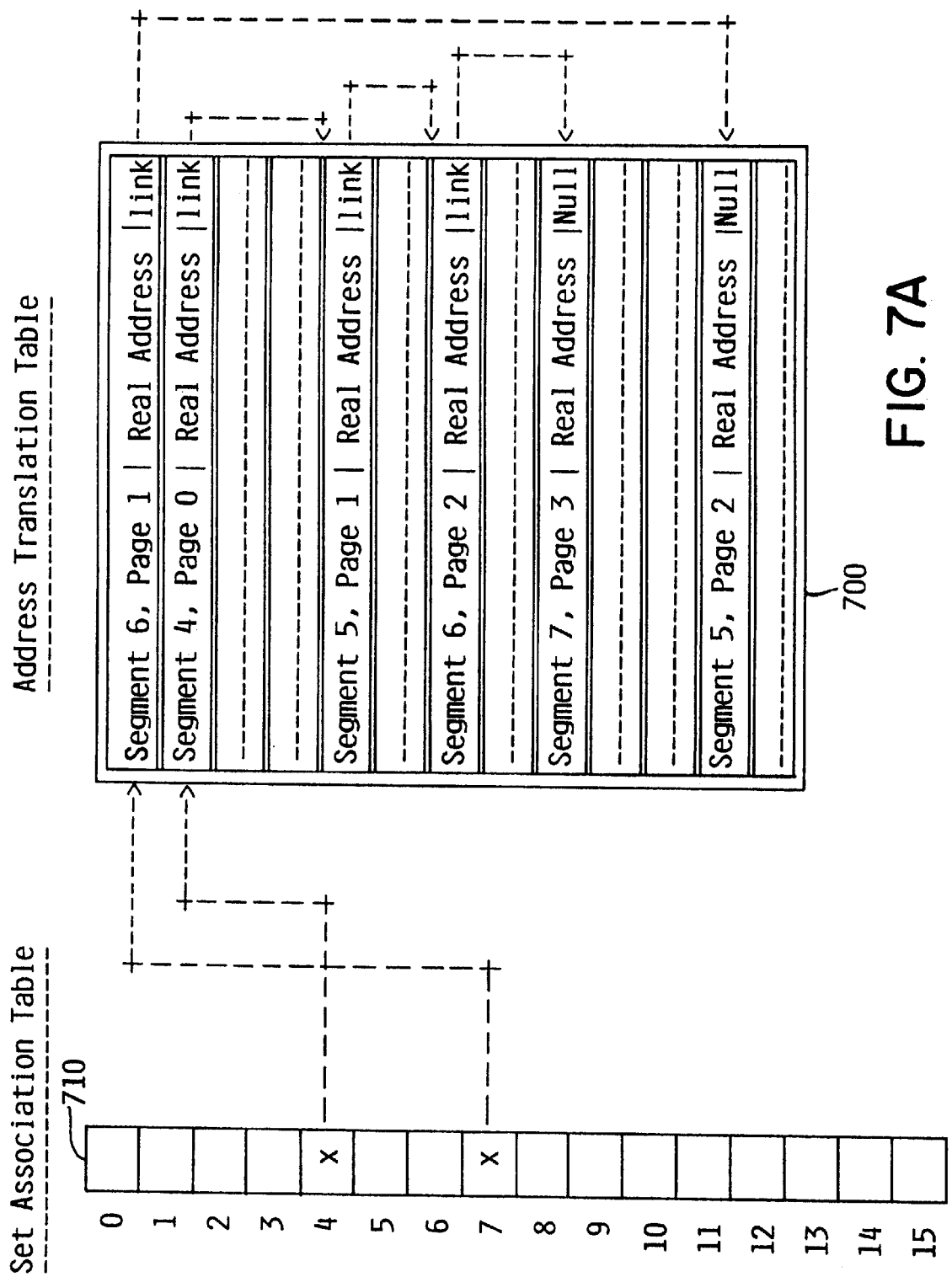
FIG. 7A shows how example virtual addresses would be distributed in an alternate address translation table using sequential address allocation.
Figure 7B:
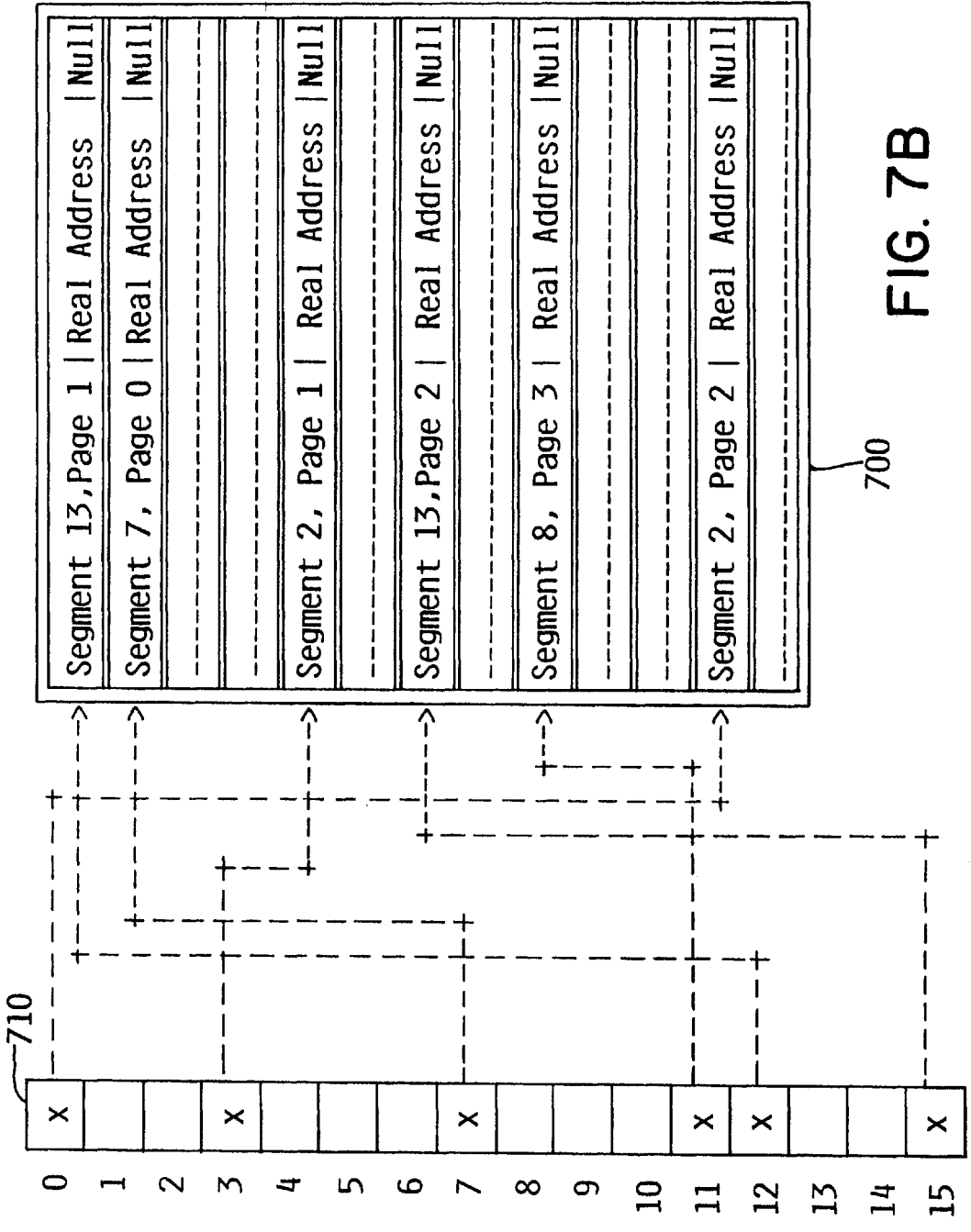
FIG. 7B shows how example virtual addresses would be distributed in an alternate address translation table using the address allocation mechanism of the present invention.

While the preferred embodiment has been described in relation to a specific type of address translation mechanism, it should be understood that the present invention is not limited to any one type. Indeed, the present invention is equally applicable to any address translation mechanism that associates certain sets of addresses with subportions of a translation table, regardless of whether those subportions arc created physically, as in the case of the preferred embodiment, or logically, as in the case of other known types of address translation mechanisms. FIG. 7A shows how example virtual addresses would be distributed in a logically subportioned address translation table using sequential address allocation and FIG. 7B shows how example virtual addresses would be distributed in a logically subportioned address translation table using the address allocation mechanism of the present invention.

As shown on FIG. 7A, this alternate logical address translation mechanism utilizes two tables, set association table 710 and address translation table 700. Set association table 710 is used to logically subportion address translation table 700. As in the preferred embodiment, the subportioning of the table is accomplished with a hashing function. For the sake of comparison, the hash function used is the same as that used in the preferred embodiment. The segments shown in the table have been allocated sequentially. When a program wants to access particular information, it presents the virtual address to the central processing unit. As before, the central processing unit will perform an XOR operation on the segment Id. and the page Id. and thereby select a set of translation table entries. In this case, though, the set of virtual addresses is formed by chaining translation table entries together.

For example, if a program presented the virtual address of segment 5, page 1 to the central processing unit, the central processing unit would determine that this virtual address was in set 4 and check the entry for segment 4, page 0 to see if it matched the presented address. Finding that the virtual address did not match the presented virtual address, the central processing unit would follow the link down to the entry for segment 5, page 1. Once the central processor located the correct entry, it would make the translation into the real address and return the information to the requesting program.

When a presented virtual address is not in address translation table 700, the address is entered into an unused entry and that entry is added to an existing (possibly empty) chain of entries. While this type of address translation mechanism does not require entries to be cast out to make room for a new entry, clumping within the table still occurs as a result of the typical behavior of programs and the sequential nature of prior art address allocation. The clumping, however, is not physical, as in the case of the address table of the preferred embodiment. Instead, the clumping is logical because the entries themselves are linked together in a logical fashion. For example, segment 4, page 0; segment 5, page 1; segment 6, page 2; and segment 7, page 3 are all logically clumped together. As with the physical clumping shown on FIGS. 4A and 4B, this logical clumping has the effect of increasing address translation time because the clumping increases the number of links that must be traversed to perform the address translation.

Consider now how address translation table 700 appears in FIG. 7B. Note that the fifth, sixth, seventh and eighth segments allocated by address allocation mechanism 170 are segments 7, 2, 13, and 8 respectively. When the above-described set association is performed on the indicated pages of these segments, the entries are so well distributed in address translation table 700 that chaining is not necessary. The lack of chaining means that no clumping has occurred, which means that address translation time does not suffer because of extensive link traversal.

The embodiments and examples set forth herein were presented in order to best explain the present invention and its practical application and to thereby enable those skilled in the art to make and use the invention. However, those skilled in the ail will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the following claims.

What is claimed is:

1. A first program, said first program comprising:

a virtual address space, said virtual address space being divided into logical storage aggregates, a first storage aggregate of said logical storage aggregates being allocated for use by a plurality of second programs and a second storage aggregate of said logical storage aggregates being allocated for use by said plurality of second programs, said virtual address space having a third storage aggregate of said logical storage aggregates allocated for use by said plurality of second programs, said logical storage aggregates being made up of a plurality of virtual memory pages such that said first storage aggregate of said logical storage aggregates is made up of a first plurality of virtual memory pages, said second storage aggregate of said logical storage aggregates is made up of a second plurality of virtual memory pages, and said third storage aggregate of said logical storage aggregates is made up of a third plurality of virtual memory pages, said virtual address space being managed through the use of an address translation table, said address translation table being divided into sets of entries by a set association mechanism, each of said entries being created for storage of a virtual address of one of said plurality of virtual memory pages, said set association mechanism dividing said address translation table into said sets of entries by associating specific sets of said plurality of virtual memory pages with each set of said sets of entries; and an address allocation mechanism, said address allocation mechanism being used to allocate said first storage aggregate of said logical storage aggregates, said second storage aggregate of said logical storage aggregates, and said third storage aggregate of said logical storage aggregates in a non-sequential manner.

* * * * *